US012613390B2

(12) United States Patent
Moreira et al.

(10) Patent No.: US 12,613,390 B2
(45) Date of Patent: Apr. 28, 2026

(54) TELECOMMUNICATIONS CABLE TERMINATION BOX

(71) Applicant: CommScope Technologies LLC, Hickory, NC (US)

(72) Inventors: Peterson Vilela Moreira, Wilsele (BE); Karel A C Vanwinkel, Tielt-Winge (BE); Pratyushbhai A. Solanki, Panjim (IN); Swapnesh Babaji Mangaonkar, Panaji (IN)

(73) Assignee: COMMSCOPE TECHNOLOGIES LLC, Claremont, NC (US)

( * ) Notice: Subject to any disclaimer, the term of this patent is extended or adjusted under 35 U.S.C. 154(b) by 73 days.

(21) Appl. No.: 18/264,269

(22) PCT Filed: Feb. 4, 2022

(86) PCT No.: PCT/US2022/015313
§ 371 (c)(1),
(2) Date: Aug. 4, 2023

(87) PCT Pub. No.: WO2022/170096
PCT Pub. Date: Aug. 11, 2022

(65) Prior Publication Data
US 2024/0036281 A1 Feb. 1, 2024

Related U.S. Application Data

(60) Provisional application No. 63/146,429, filed on Feb. 5, 2021.

(51) Int. Cl.
G02B 6/44 (2006.01)
H04Q 1/06 (2006.01)
(Continued)

(52) U.S. Cl.
CPC ......... G02B 6/44515 (2023.05); G02B 6/444 (2013.01); G02B 6/4446 (2013.01);
(Continued)

(58) Field of Classification Search
CPC ...... G02B 6/444; G02B 6/4446; G02B 6/445; G02B 6/44515; G02B 6/4454;
(Continued)

(56) References Cited

U.S. PATENT DOCUMENTS 6,215,938 B1 4/2001 Reitmeier et al.
7,522,805 B2 * 4/2009 Smith ................... G02B 6/4452
385/135
(Continued)

FOREIGN PATENT DOCUMENTS

EP 2 508 928 B1 8/2015
WO 2014/072368 A1 5/2014

OTHER PUBLICATIONS

Extended European Search Report for Application No. 22750465.1 mailed Nov. 25, 2024.
(Continued)

*Primary Examiner* — Ryan A Lepisto
(74) *Attorney, Agent, or Firm* — Merchant & Gould P.C.

(57) ABSTRACT

A telecommunications cable termination box is wall mountable. An interior holds fiber optic splices, fiber optic connectors and adapters, and blown fiber tubes. The interior of the box is sealed. The box has an outer housing and an inner tray. The outer housing includes a hinged cover, snaps for holding the cover to the base, and a seal between the cover and the base, and a tray flange of the tray. Cable slack is managed in the interior to avoid sharp bends of the cables. The cable input ports and output ports are sealed by grommets. Different grommets can be provided depending on the number of cables and the cable sizes. The inner tray can hold
(Continued)

gas block seal devices that seal the ends of the blown fiber tubes.

3 Claims, 23 Drawing Sheets

(51) Int. Cl.
 *H02G 15/013* (2006.01)
 *H02G 15/06* (2006.01)
(52) U.S. Cl.
 CPC ........... *G02B 6/445* (2013.01); *G02B 6/4454* (2013.01); *G02B 6/4457* (2013.01); *H04Q 1/06* (2013.01); *H02G 15/013* (2013.01); *H02G 15/06* (2013.01)
(58) Field of Classification Search
 CPC .... G02B 6/4457; H02G 15/013; H02G 15/06; H04Q 1/06
 See application file for complete search history.

(56) References Cited

U.S. PATENT DOCUMENTS

| | | | |
|---|---|---|---|
| 7,756,379 B2 | 7/2010 | Kowalczyk et al. | |
| 7,889,961 B2 | 2/2011 | Cote et al. | |
| 8,472,775 B2 * | 6/2013 | Corbille | G02B 6/445 |
| | | | 385/135 |
| 8,540,436 B2 | 9/2013 | Claessens et al. | |
| 9,008,483 B2 * | 4/2015 | Larsson | G02B 6/44785 |
| | | | 385/135 |
| 9,036,974 B2 | 5/2015 | LeBlanc et al. | |
| 9,063,316 B2 | 6/2015 | Loeffelholz et al. | |
| 9,188,760 B2 | 11/2015 | Kowalczyk et al. | |
| 9,261,663 B2 | 2/2016 | Loeffelholz et al. | |
| 9,442,266 B2 | 9/2016 | Kowalczyk et al. | |
| 10,416,404 B2 | 9/2019 | Holmberg et al. | |
| 10,637,220 B2 | 4/2020 | Van Baelen | |
| 2010/0329624 A1 * | 12/2010 | Zhou | G02B 6/4454 |
| | | | 385/135 |
| 2011/0262095 A1 * | 10/2011 | Fabrykowski | G02B 6/475 |
| | | | 385/135 |
| 2017/0059800 A1 | 3/2017 | Kowalczyk et al. | |
| 2017/0269324 A1 | 9/2017 | Im | |
| 2018/0329163 A1 | 11/2018 | Sadasivan et al. | |
| 2020/0124809 A1 | 4/2020 | Kowalczyk et al. | |

OTHER PUBLICATIONS

International Search Report and Written Opinion for Application No. PCT/US2022/015313 mailed May 23, 2022.

* cited by examiner

62

92

TELECOMMUNICATIONS CABLE TERMINATION BOX

CROSS-REFERENCE TO RELATED APPLICATION

This application is a National Stage Application of PCT/US2022/015313, filed on Feb. 4, 2022, which claims the benefit of U.S. patent application Ser. No. 63/146,429, filed on Feb. 5, 2021, the disclosures of which are incorporated herein by reference in their entireties. To the extend appropriate, a claim of priority is made to each of the above disclosed applications.

BACKGROUND OF THE INVENTION

A telecommunications cable termination box allows for various telecommunications cables to be connected to one another, such as one or more input cables connected to one or more drop cables which lead to residential or commercial telecommunications service users. Improvements are desired with respect to the cable termination boxes which manage the telecommunications cables and connections.

SUMMARY OF THE INVENTION

A telecommunications cable termination box is provided for connecting telecommunications cables, such as fiber optic cables, to one another.

The box can be wall mountable. An interior of the box can hold fiber optic splices, splitter, fiber optic connectors and adapters, and blown fiber tubes including gas blocks. Cable slack is stored in the box. Cables entering the box can be secured to the box, such as with cable ties.

An interior of the box is preferably sealed. The box has an outer housing and an inner plate or tray. The outer housing includes a hinged cover, and preferably snaps for the cover to snap to the base. A tamper proof fastener may also be provided.

Cable slack is managed in the interior of the box to avoid sharp bends of the cables. The slack can be used in some examples to move the inner tray to a work area remote from the incoming and/or outgoing cables locations and the box outer housing.

The cable input ports and output ports are preferably sealed with grommets.

The cable input ports and output ports can receive different grommets for sealing the cables, depending on the number of cables, and the cable sizes.

The inner tray can hold gas blocks that seal the ends of blown fiber tubes, if provided.

Various knockouts can be provided to allow for different configurations of the telecommunications cable termination box.

The inner tray can include a cable pass through to an opposite side where cable slack can be stored on the backside of the inner tray.

The inner tray can be selectively positioned within the outer housing or removed from the outer housing. Cable slack can be wound around an outer spool defined by the inner tray to allow the inner tray to be moved a desired distance away from the outer housing wherein a technician can work on the fiber connections located on the inner tray.

The outer spool of the inner tray can be rotated relative to the cables to take up cable slack, and then the inner tray can be positioned within the outer housing, and enclosed within the box with the cover and base of the outer housing positioned around the inner tray.

DETAILED DESCRIPTION

Figure 1:
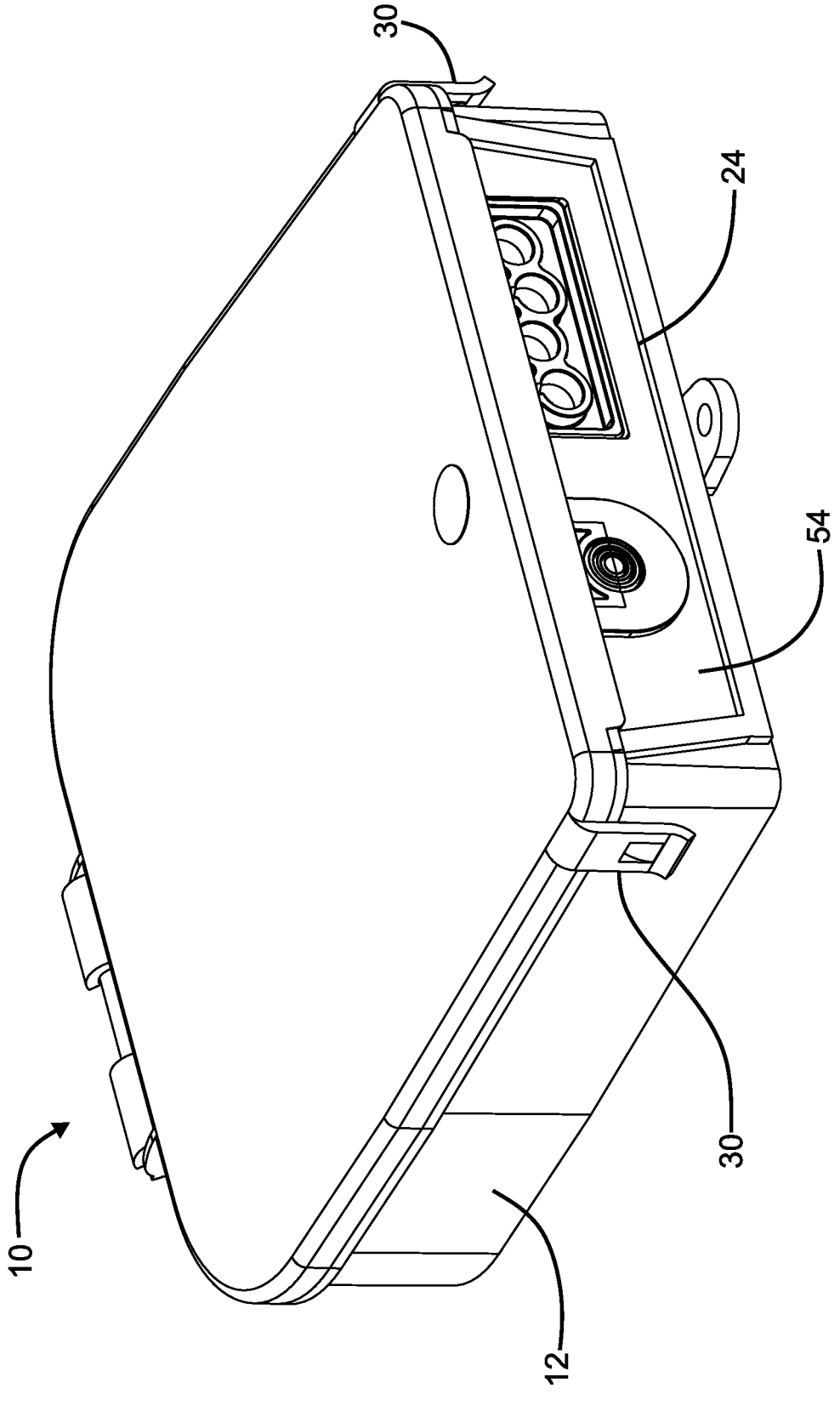
FIG. 1 is a front, left side, and bottom perspective view of an embodiment of a telecommunications cable termination box.
Figure 2:
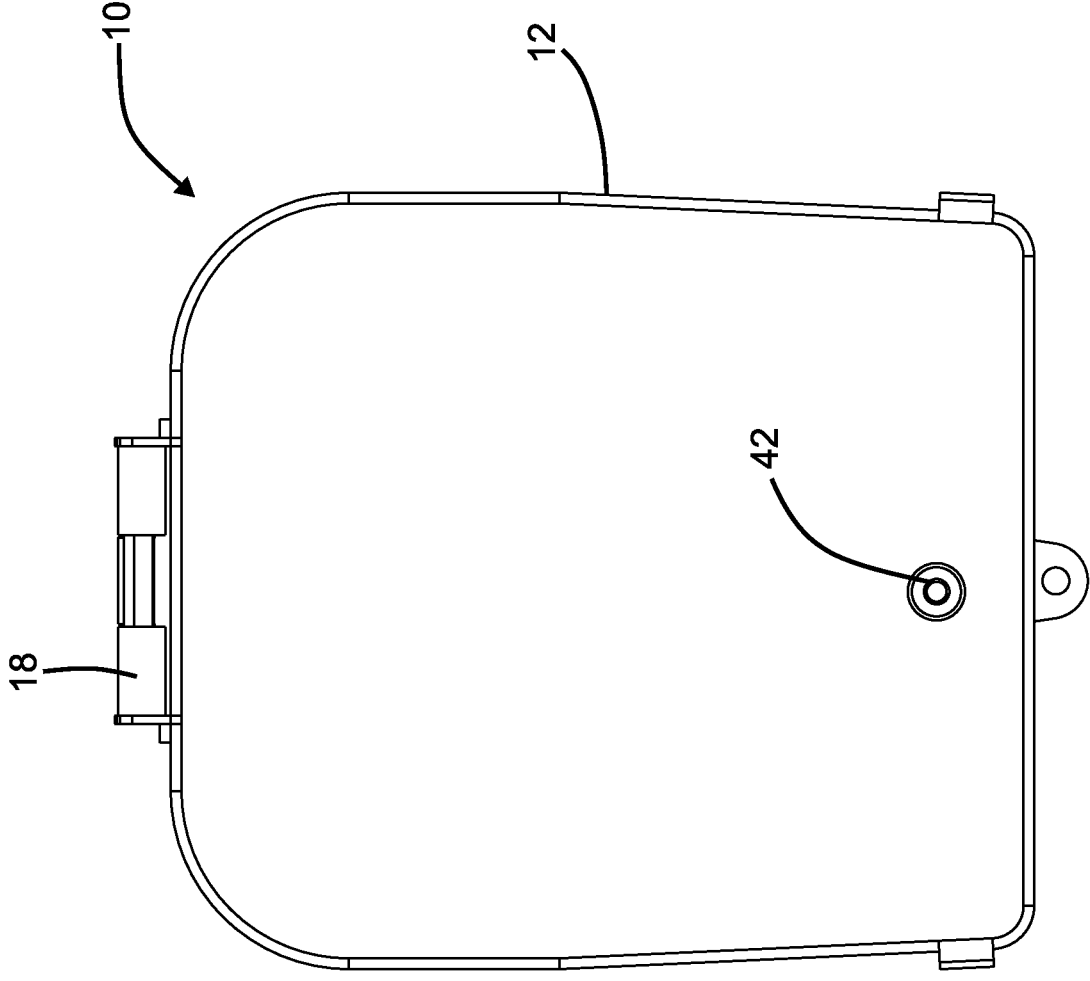
FIG. 2 is a front view of the box of FIG. 1.
Figure 3:
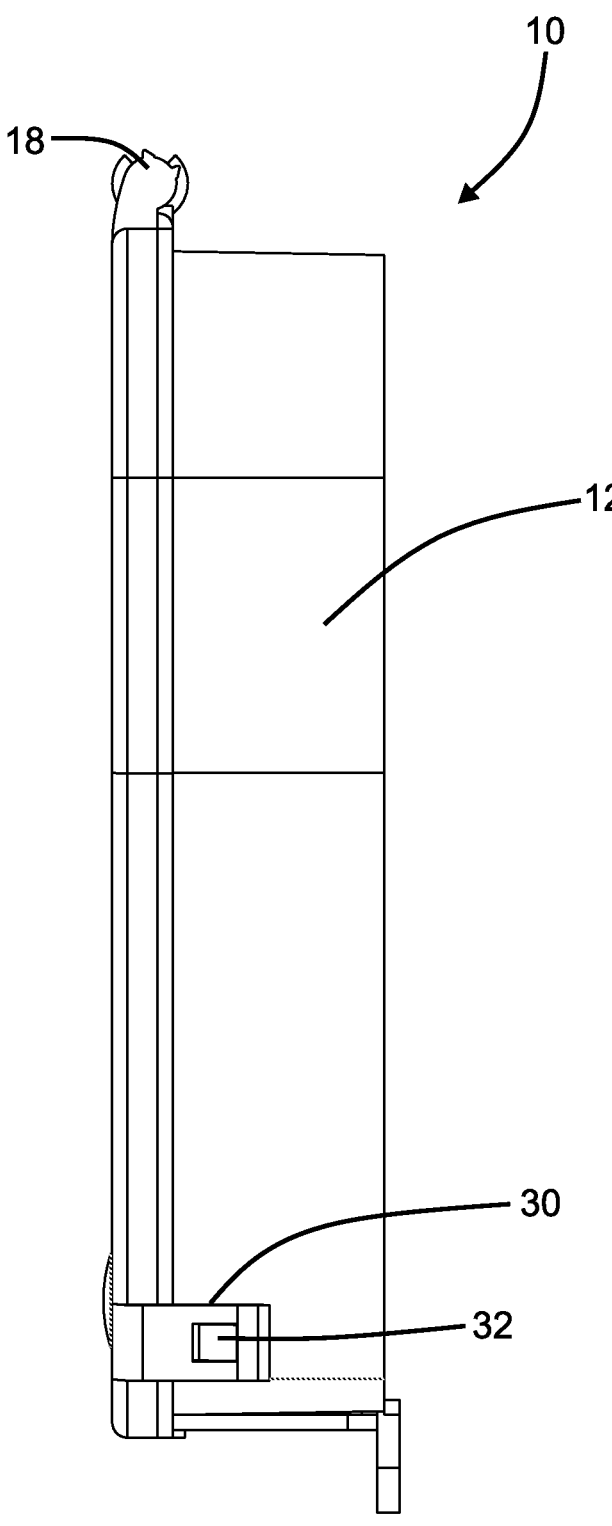
FIG. 3 is a right side view of the box of FIG. 1.
Figure 4:
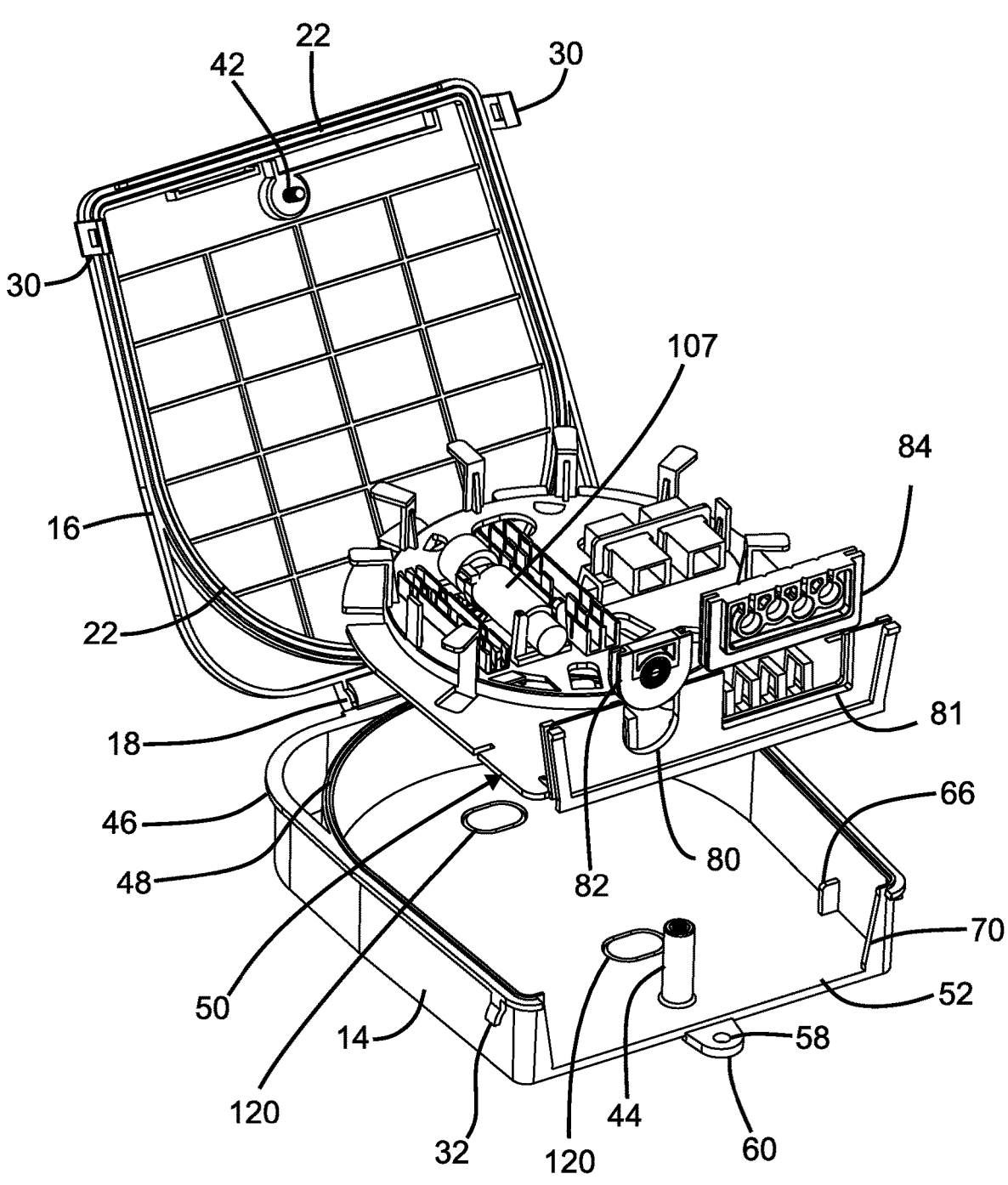
FIG. 4 is an exploded perspective view of the box and the inner tray with the cover hinged open relative to the base.

Referring now to FIGS. 1 through 5, 5A, and 5B, a telecommunications cable termination box 10 is shown. Box 10 includes an enclosure or housing 12, including a base 14 and a moveable cover 16. In the illustrated embodiment, cover 16 is mounted with a hinge 18 to base 14 to allow access to an interior 20 of box 10.

A seal 22 seals cover 16 to base 14. Additional sealing features adjacent to a bottom 24 of box 10 will be described below.

In one embodiment, cover 16 snaps to base 14 in the closed position with arms 30 extending from cover 16 which engage shoulders 32 in a selective manner to secure cover 16 to base 14 in a closed position. Arms 30 and/or shoulders 32 are flexible to allow selective unsnapping and snapping of cover 16 relative to base 14. A tamper resistant fastener 40, such as a screw, can be positioned in hole 42 of cover 16 to engage a threaded post 44 of base 14. A cap 41 can be placed over the fastener 40.

As will be described further below, interior 20 of box 10 receives a tray 50. Base 14 and cover 16 together when in the closed position define an opening 52 which receives a tray flange 54 for closing the interior 20 of box 10 except for necessary cable openings.

Box 10 includes two upper mounting tabs 56 defining fastener openings 58 for mounting upper mounting tabs 56 to a wall or other structure. Openings 58 are located between an outer wall 46 and an inner wall 48 of base 14. Inner wall 48 seals to cover 16 when box is in the closed state. Box 10 further includes a lower mounting tab 60 with a fastener opening 58 for further mounting of box 10 to a wall or other structure.

Referring now to FIGS. 4 through 16, tray 50 includes a base portion 62 and a flange 54 connected at generally right angles to one another. Generally, base portion 62 defines a planer bottom surface for nesting within base 14 of housing 12. Base portion includes one or more tray slots 64 for receiving tray locating projections 66. Tray flange 54 includes opposed shoulders 68 defining a gap 74 on three sides of the tray flange 54 for receiving an edge 70 defined by opening 52. A top portion 72 of tray flange 54 seals against seal 22 along a bottom portion of box 10.

Tray flange 54 of tray 50 includes one or more openings 80, 81 for receiving cables entering and exiting interior 20 of box 10. Openings 80 are filled by a cable seal device such as grommets 82, 84 which can receive one or more cables and can be sized appropriately for the cables to be received. Grommets 82, 84 can be wrap around style, with a slit 88 for being placed around cables. Slits can be made in the field as needed during installation.

In some examples, tray flange 54 further includes a knockout 86 which can be removed to increase the region for receipt of one of the larger grommets 84.

Base portion 62 of tray 50 can include one or more features associated with connecting cables together and/or managing of the cables within interior 20 of box 10. In one example, a splice holder 90 can be mounted on base portion 62 for holding one or more fiber splices 92.

A splitter holder 94 can be provided if desired.

An adapter holder 96 on base portion 62 of tray 50 can receive one or more fiber optic adapters 98 which align fiber optic connectors 100 in alignment for signal transmission.

Base portion 62 of tray 50 can also include a blown tube holder 106 for securing a blown fiber tube to interior 20 of box 10. Typically, a gas block device 107 seals an end of any blown fiber tube to prevent moisture, gas, vapor from entering the box 10 through the blown fiber tube. Typically, the fiber passes through the gas block device and into interior 20 of box 10, for connection to other cables.

Base portion 62 of tray 50 includes a plurality of cable tie bars 108 for tying cables to base portion 62, such as with a cable tie, for example a zip tie device.

Base portion 62 includes a plurality of extending fingers 112 with fiber retention tabs 114 to define a slack pathway 116 for storing loops of fiber optic cable. Strength ribs 115

Base 14 may also include a knockout portion 120 to allow for a cable to enter through a rear of box 10.

Grommets 82, 84 include opposed shoulders 124 on three sides which receive edges 128 of openings 80 through tray flange 54, or recessed edges 89 for grommet 84.

Figure 6:
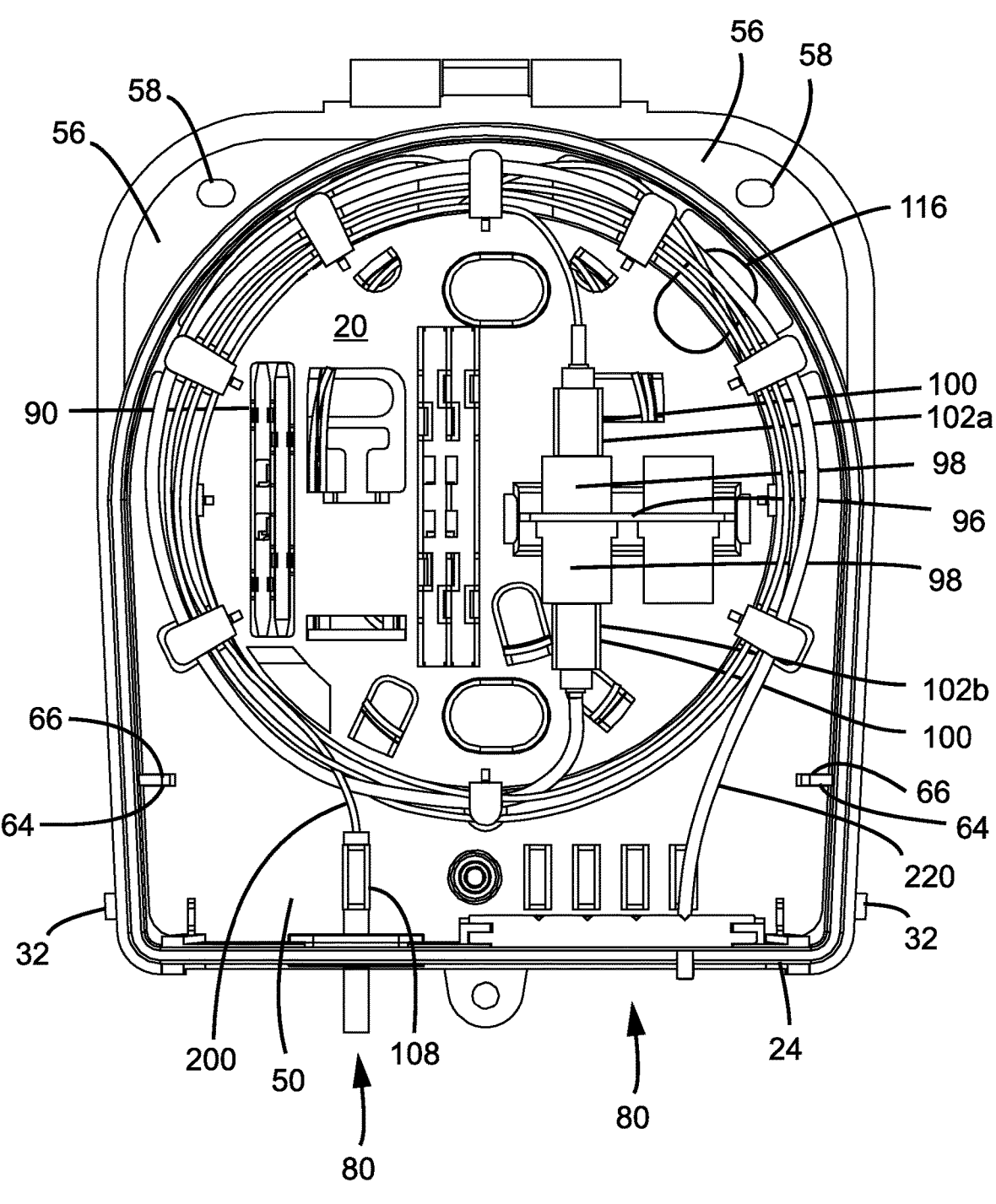
FIG. 6 is a front view of the box of FIG. 1, with the cover removed and showing one arrangement for cable routing.

Referring now to FIG. 6, box 10 shows an input cable 200 managed in slack pathway 116 after passing through grommet 82 and being terminated with a fiber optic connector 102a. Input cable 200 can be tied at a cable tie bar 108 in interior 20 of box 10. Drop cable 220 includes a fiber optic connector 102b that is in signal transmission alignment with fiber optic connector 102a through adapter 98a.

Figure 7:
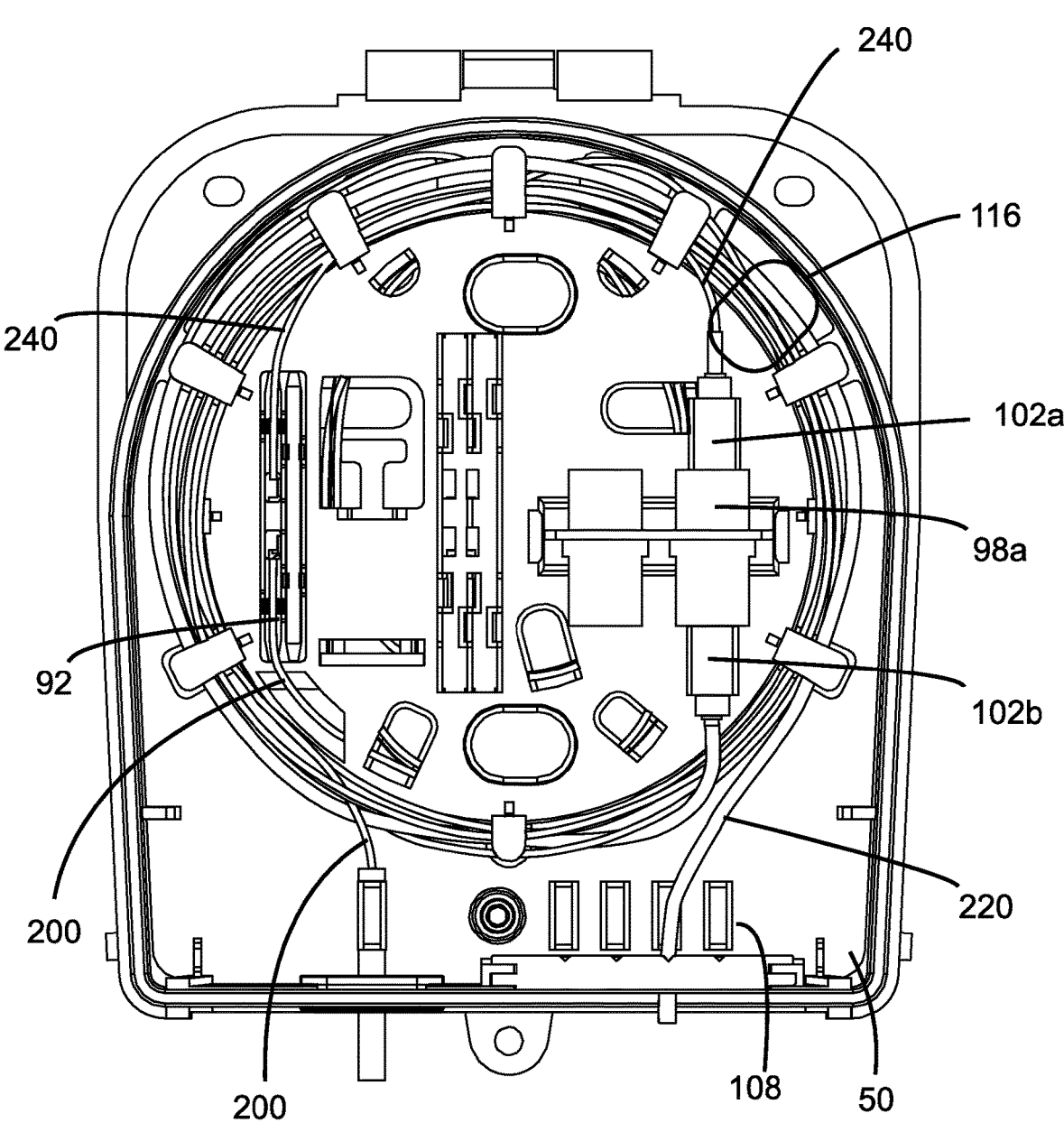
FIG. 7 is a view like FIG. 6, showing a second cable routing arrangement.

Referring now to FIG. 7, an alternative cable routing arrangement is shown wherein input cable 200 is connected to a pigtail 240 at splice 92. Pigtail 240 includes a connector 102a which is in alignment connector 102b of drop cable 220 at adapter 98a.

Figure 5:
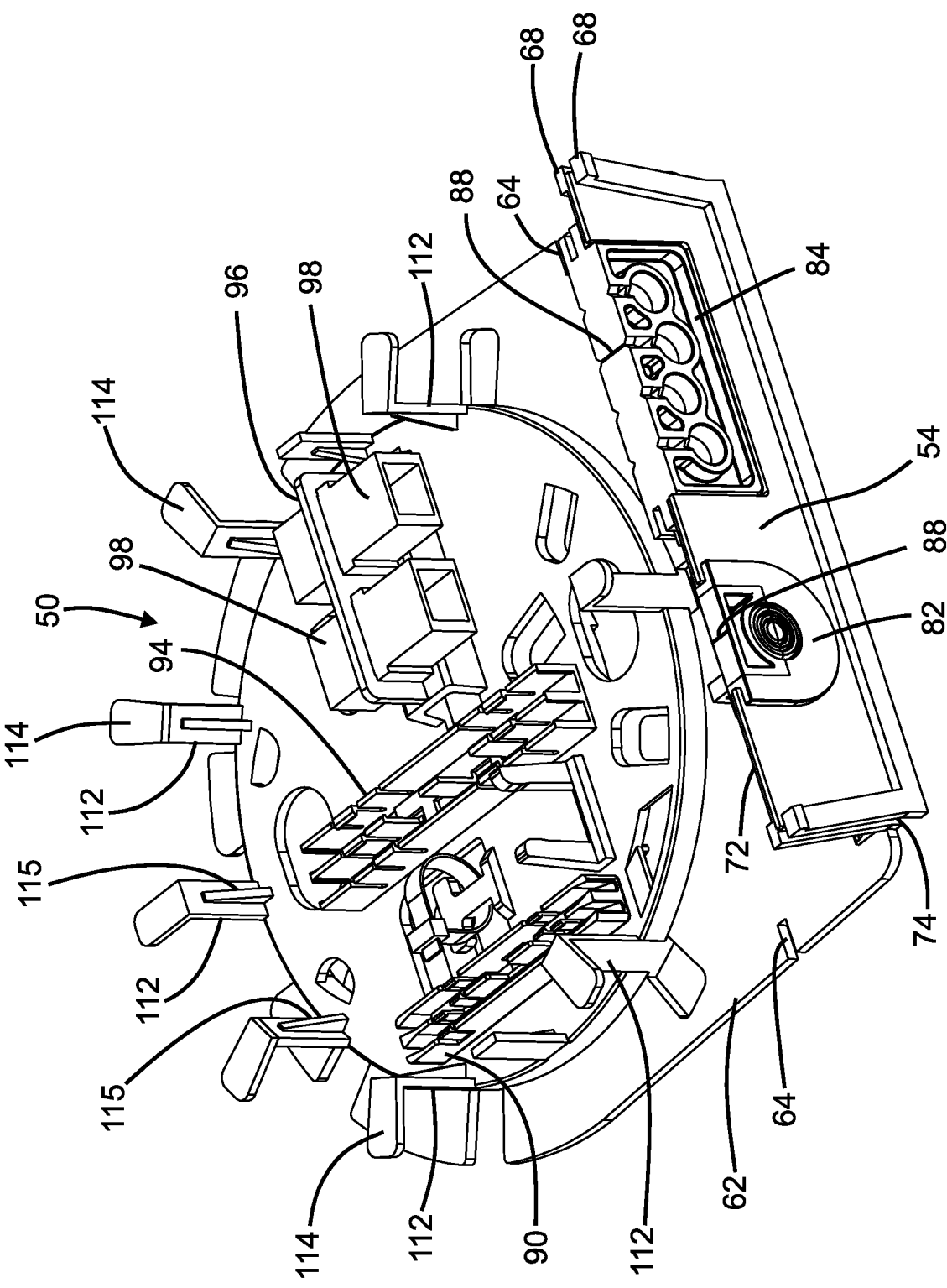
FIG. 5 is an enlarged view of the tray of the box of FIG. 1.
Figure 5A:
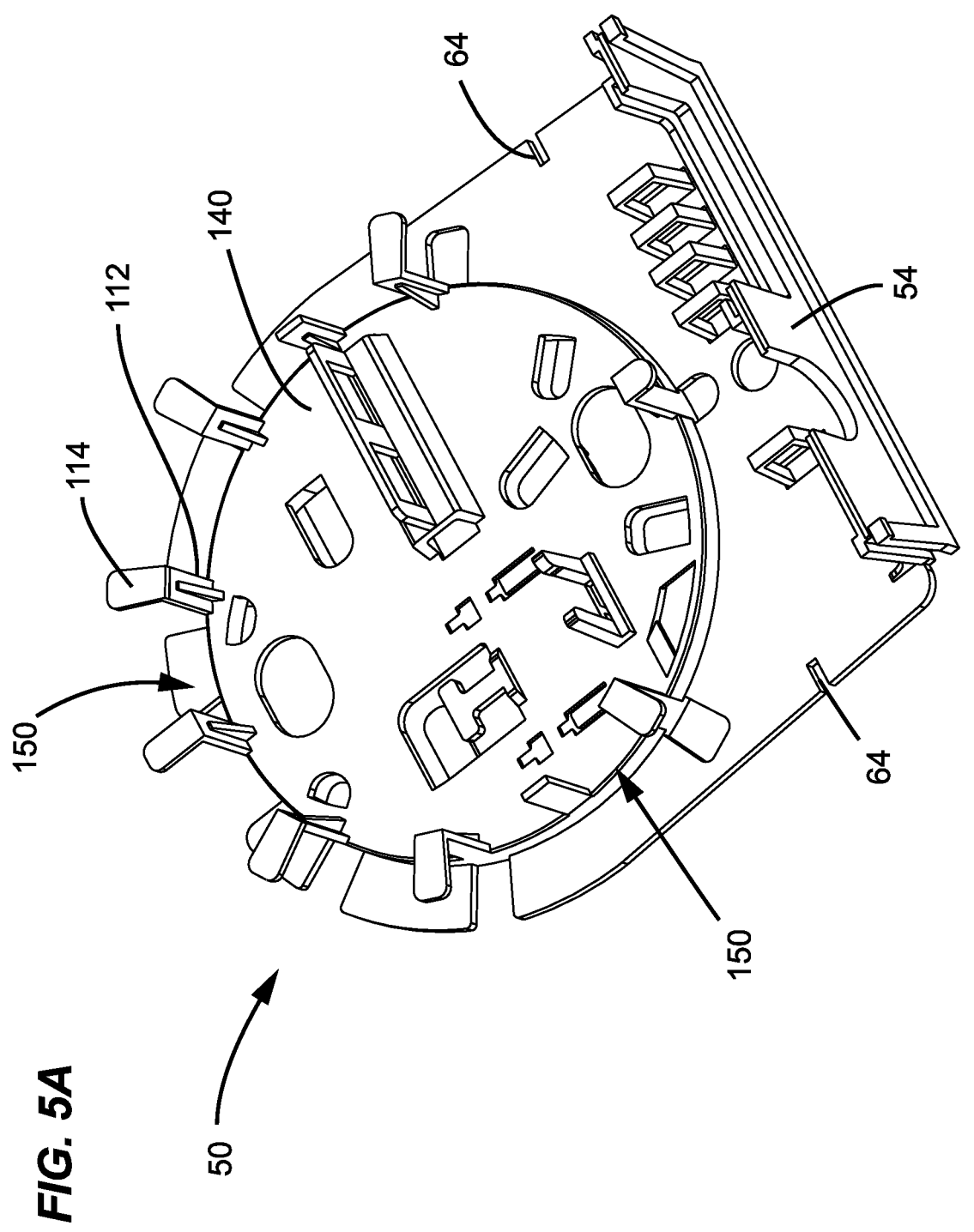
FIG. 5A shows a further view of the tray without any components mounted thereto.
Figure 5B:
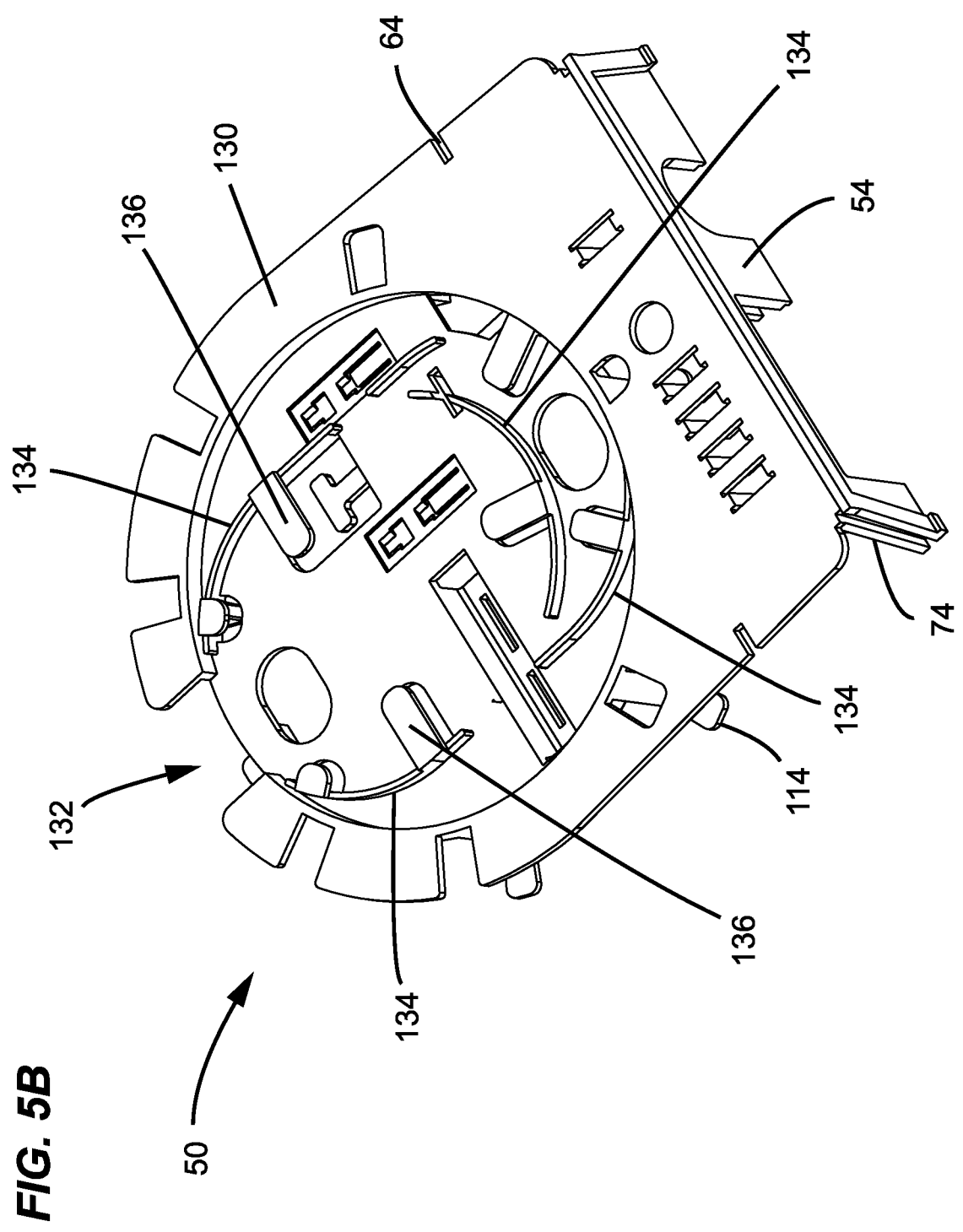
FIG. 5B shows a back side of the tray of FIG. 5A.
Figure 6A:
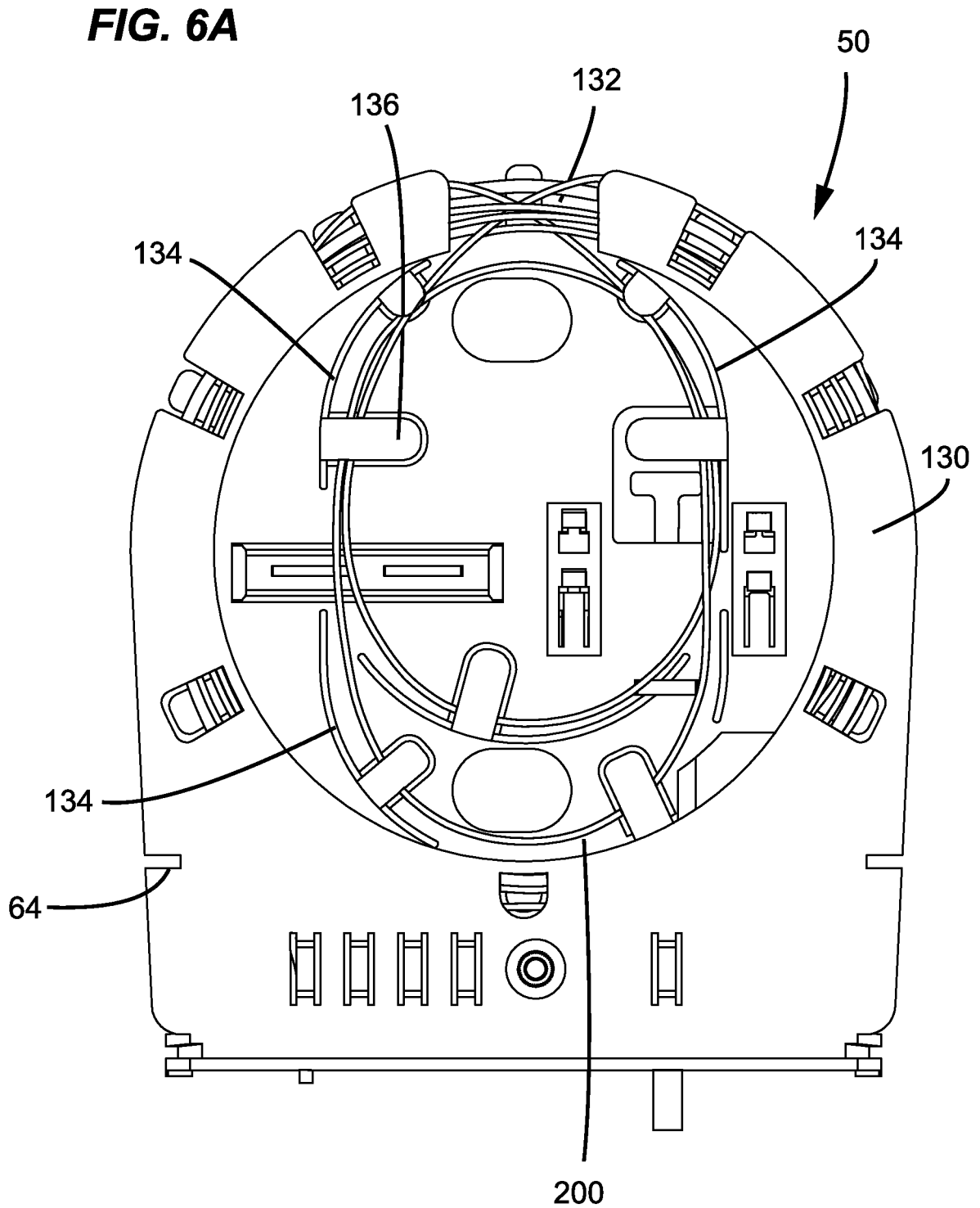
FIG. 6A shows a back side of the tray of FIG. 6.
Figure 6B:
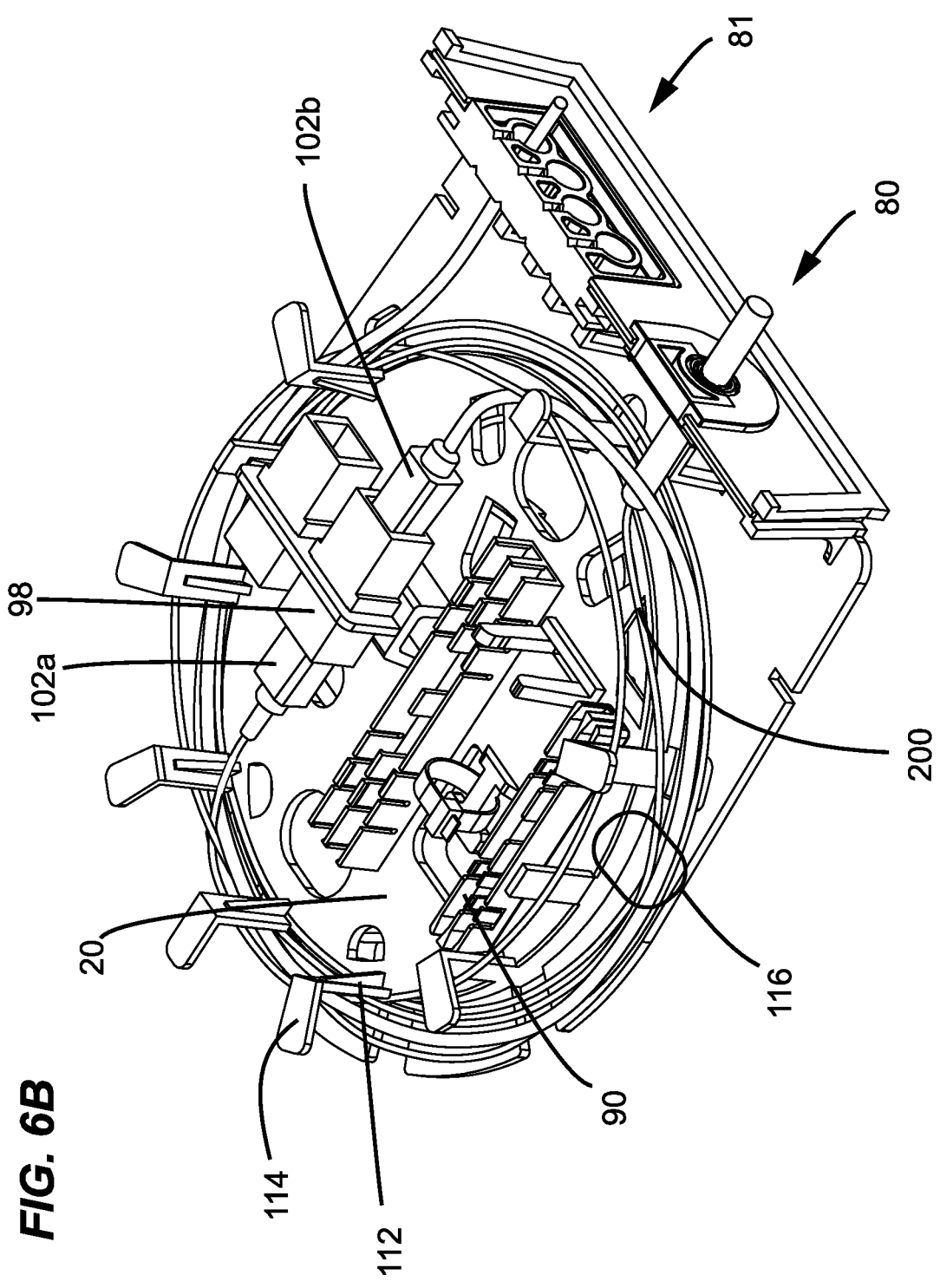
FIG. 6B shows a perspective view of the tray of FIG. 6.
Figure 7A:
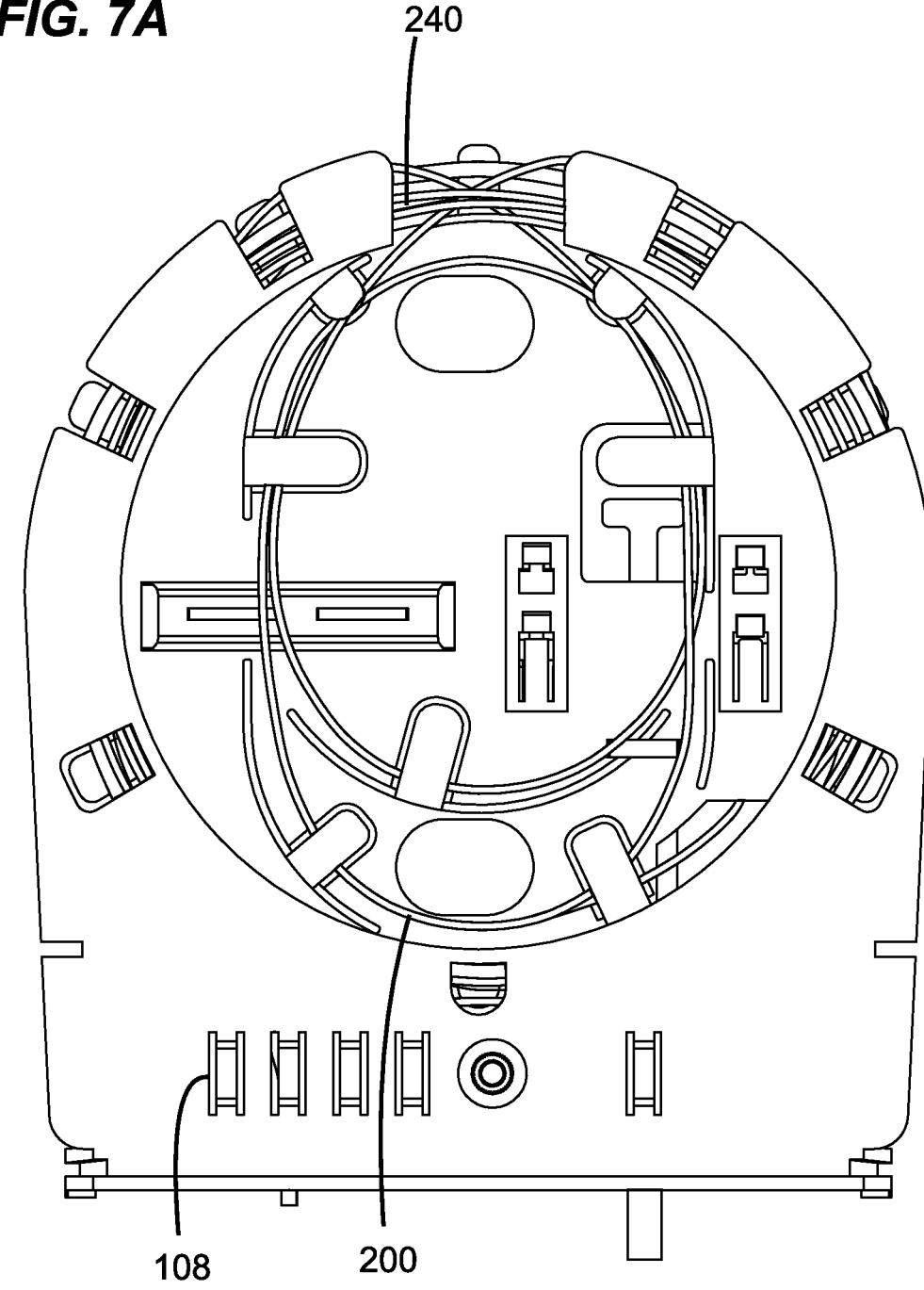
FIG. 7A shows a back side of the tray of FIG. 7.
Figure 7B:
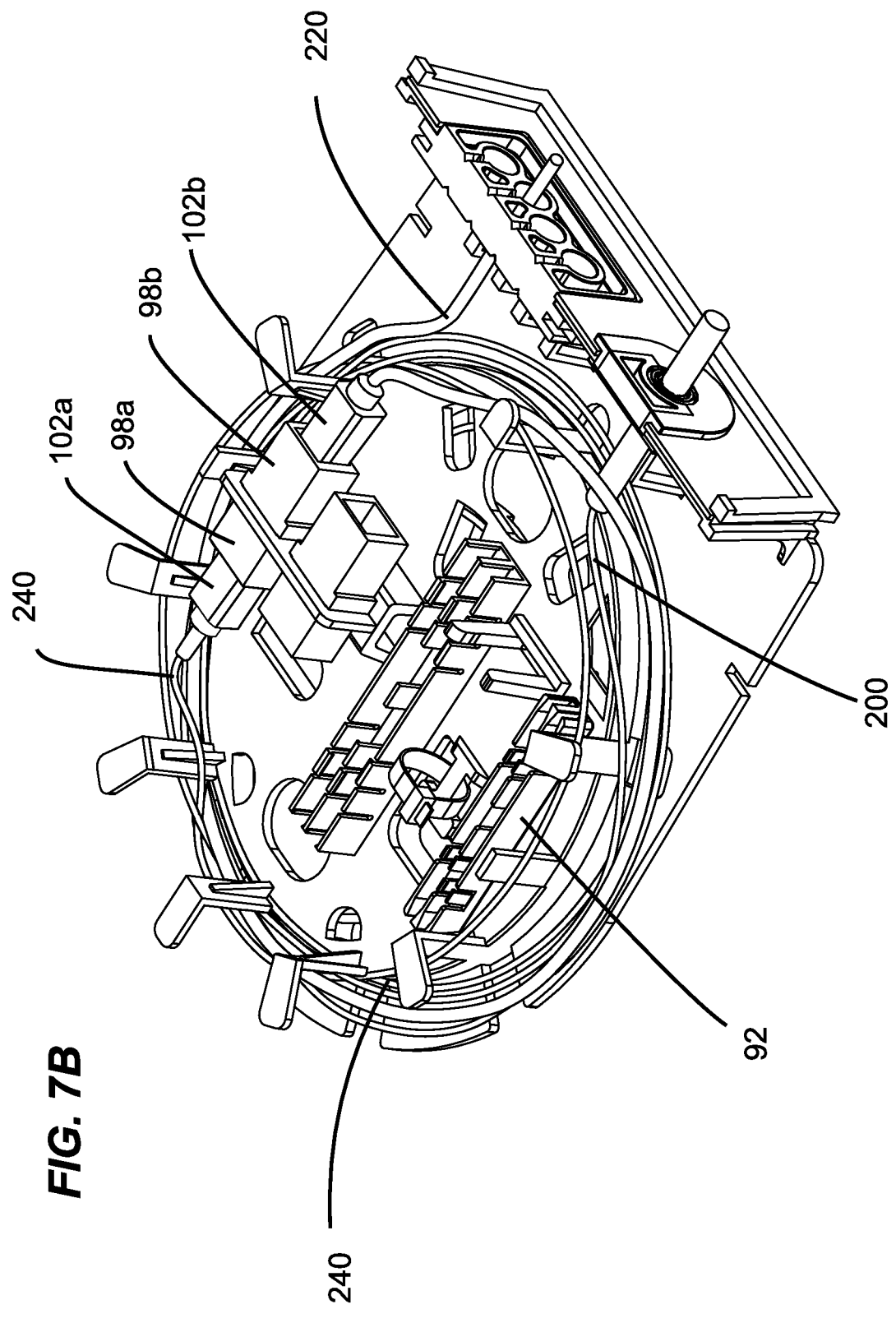
FIG. 7B shows a perspective view of the tray of FIG. 7.

Referring now to FIGS. 5B, 6A, and 7A tray 50 includes a backside 130 accessed by one or more cable pass throughs 132. Backside 130 of tray 50 includes cable management walls 134 and tabs 136 for managing loops of cable. Such an area can be useful for managing excess of the 250 micron type fiber or other fiber that is spliced or utilized in other manners on a front side 140 of tray 50.

Fingers 112 define an outer spool 150 in one embodiment where the cables can be wound around spool 150 by hand and/or by rotating tray 50 separated from outer housing 12. In one example, tray 50 can be separated from base 14 and moved to a remote location such as a table, work surface, or vehicle where a technician can work on the fiber connections and other components on tray 50 away from the mounting location within housing 12. Such can be useful when box 10 is mounted in difficult to access areas where a technician may have difficultly working on splices or other operations in a confined space within box 10. By allowing the theatre and/or the drop cables to be wound around spool 150 the cables can be unspooled and spooled around spool 150 as tray 50 is moved away from or toward housing 12.

Figure 8:
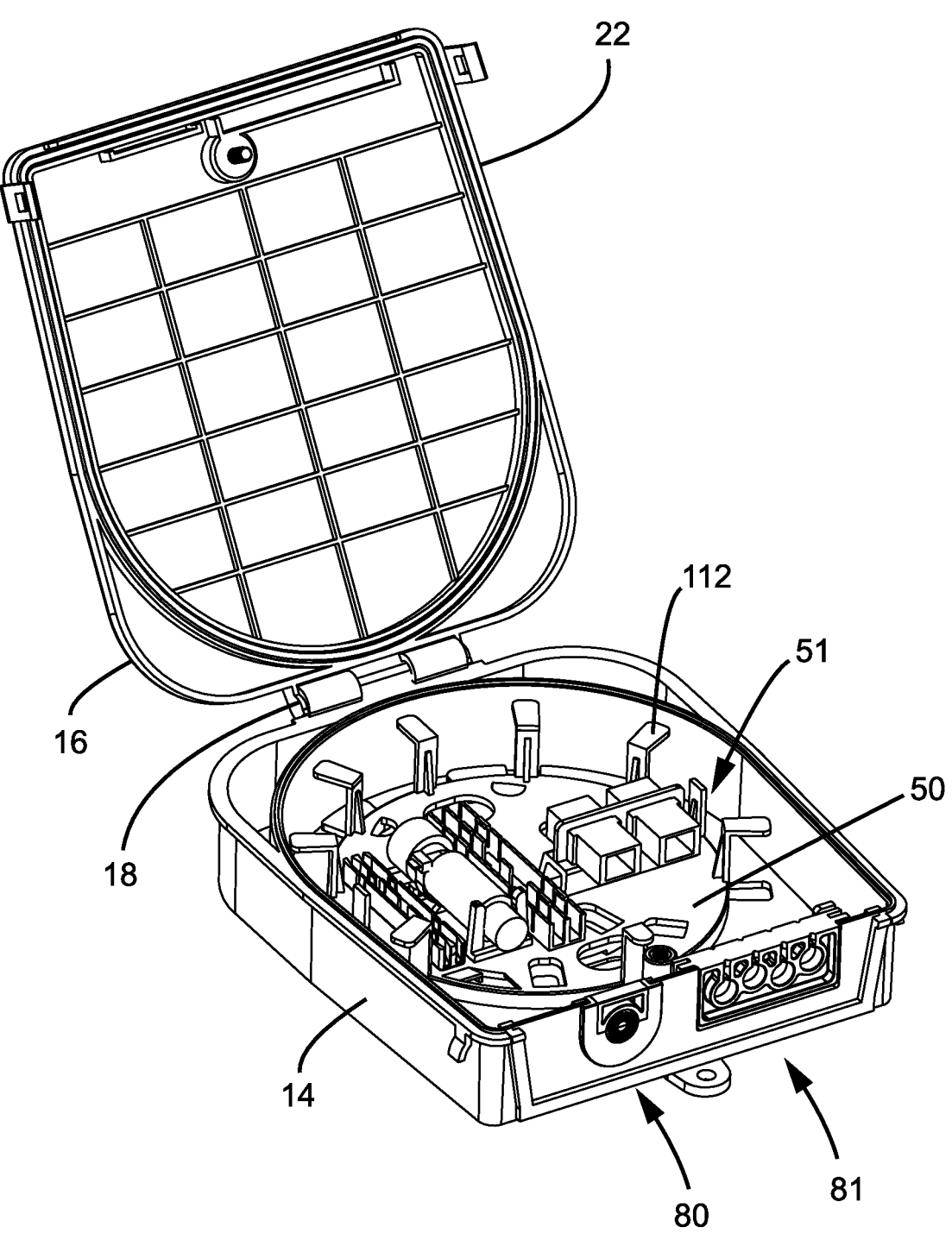
FIG. 8 is a perspective view of the box of FIG. 1, showing the cover in the open position.
Figure 9:
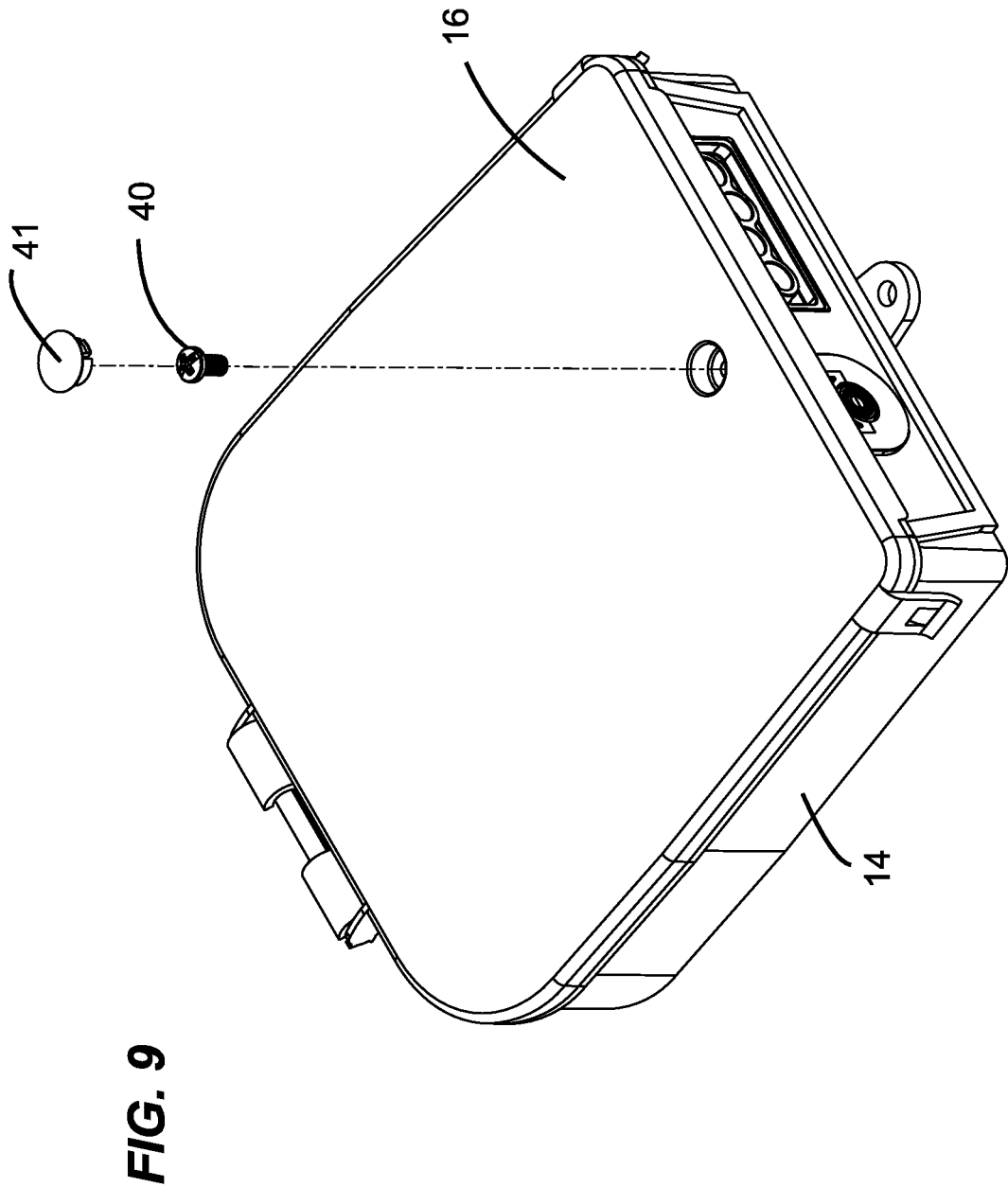
FIG. 9 is a perspective view of the box of FIG. 1, with the fastener shown in exploded view.

As shown in FIG. 8, tray 50 sits in a pocket 51 of base 14. By allowing for tray 50 to be removable from base 14 greater technician access is allowed, such as for working on the fiber connections, and being able to work on the tray remote from the housing 12, through the use of the spooling and unspooling operation.

Figure 10:
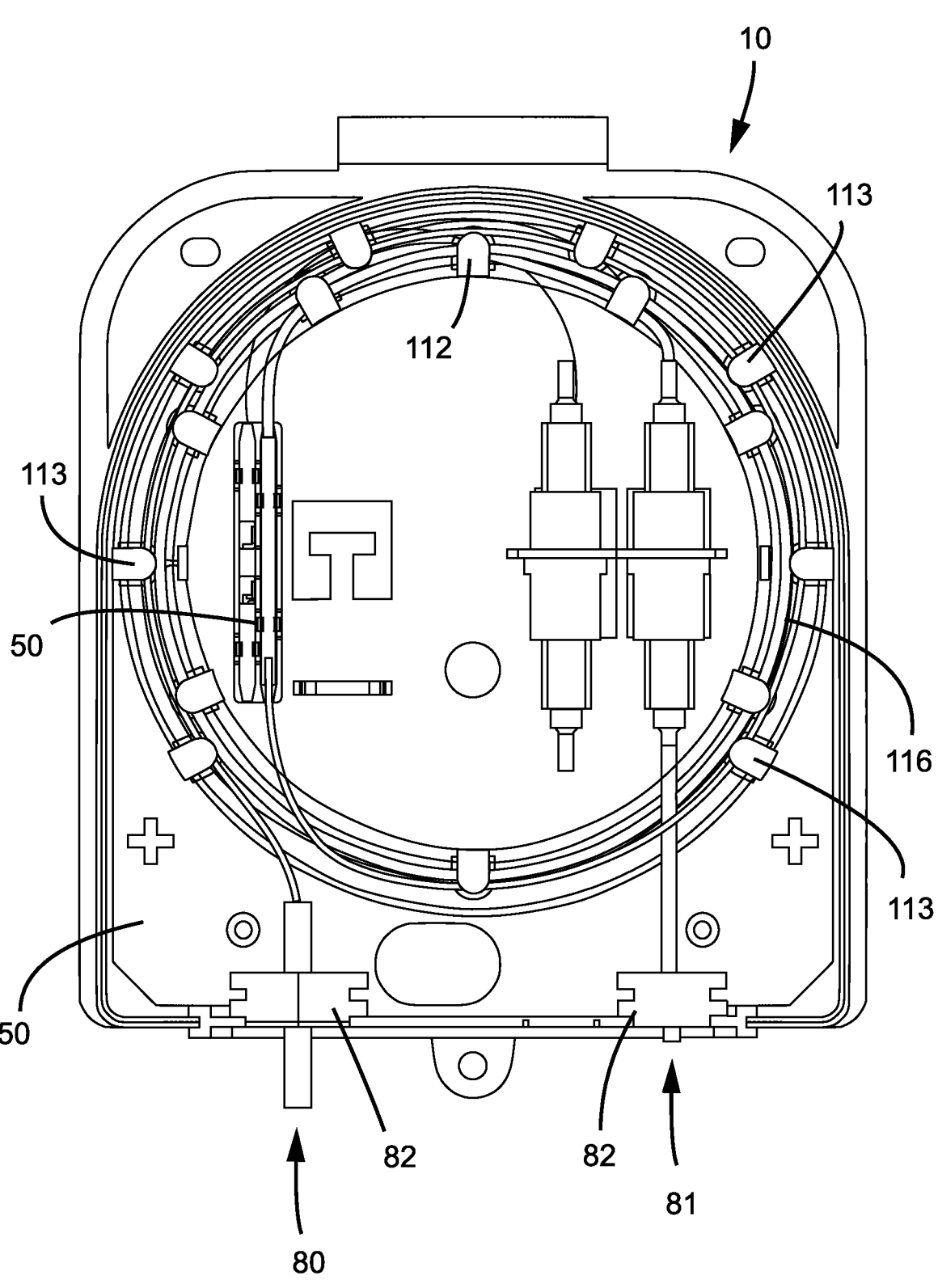
FIG. 10 is a front view of the box of FIG. 1, with the cover removed.
Figure 11:
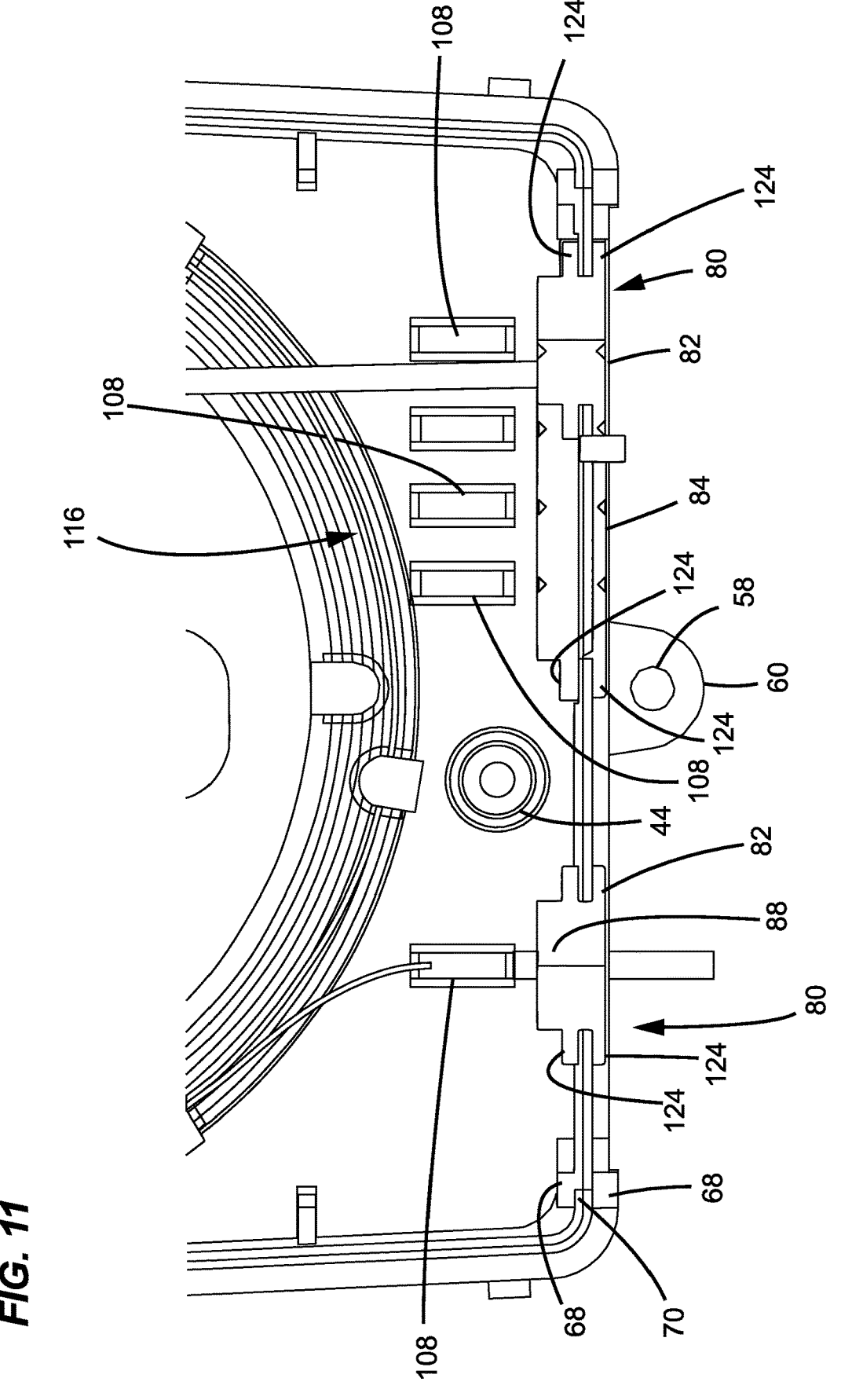
FIG. 11 is an enlarged view of a lower portion of the base and the tray of the box of FIG. 1.
Figure 12:
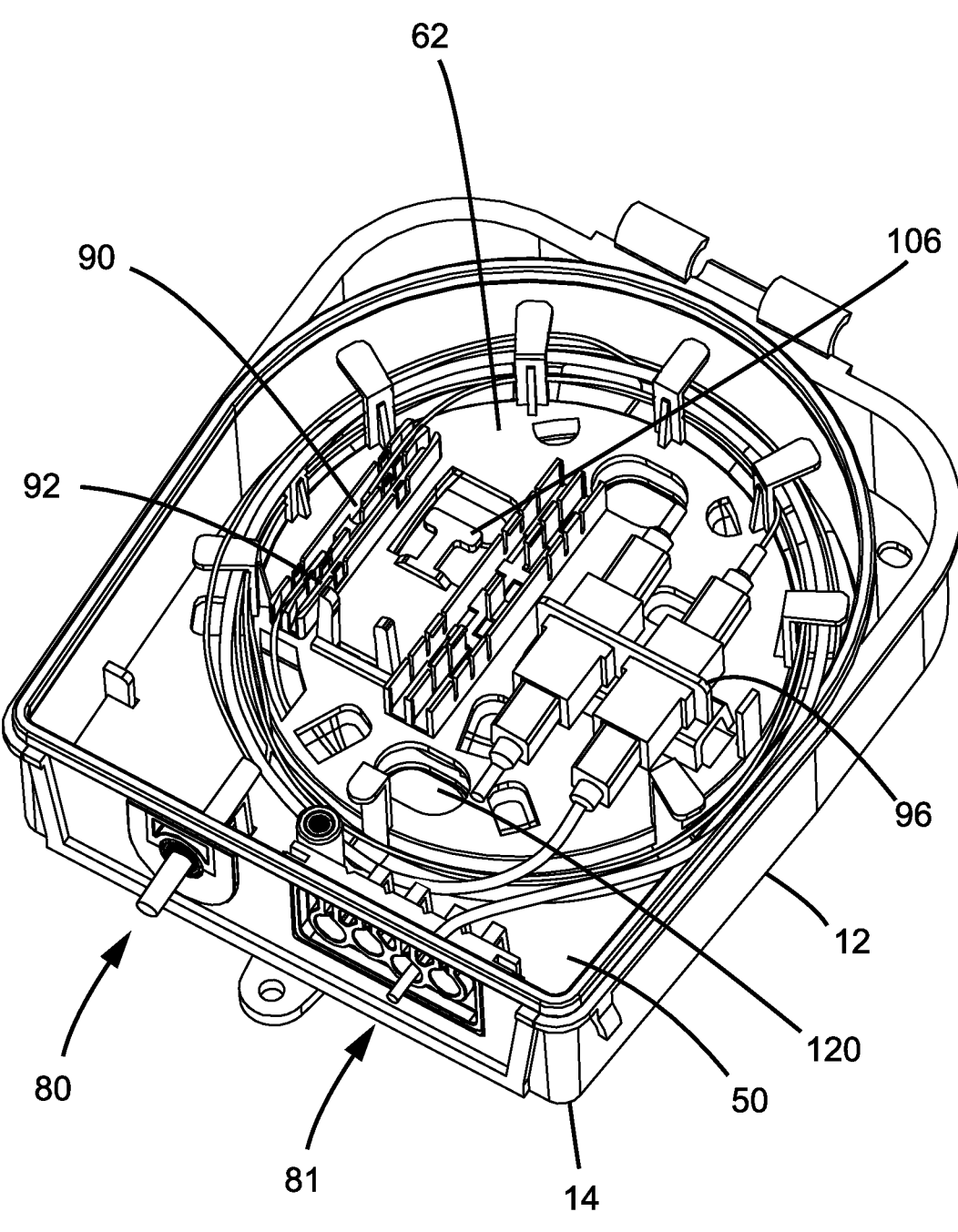
FIG. 12 is a front, right side, and bottom perspective view of the box of FIG. 1, with the cover removed.
Figure 12A:
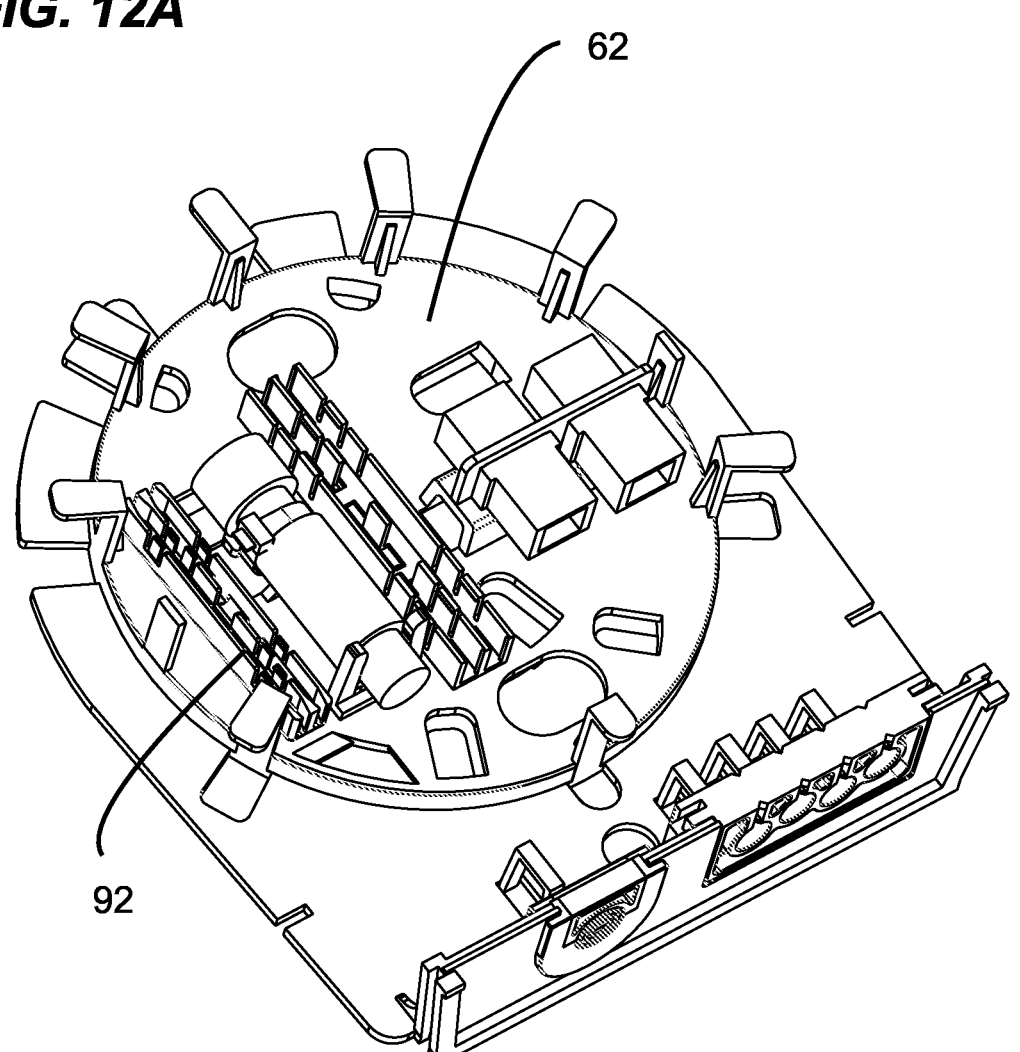
FIG. 12A shows a further perspective view of the tray of FIG. 12.
Figure 13:
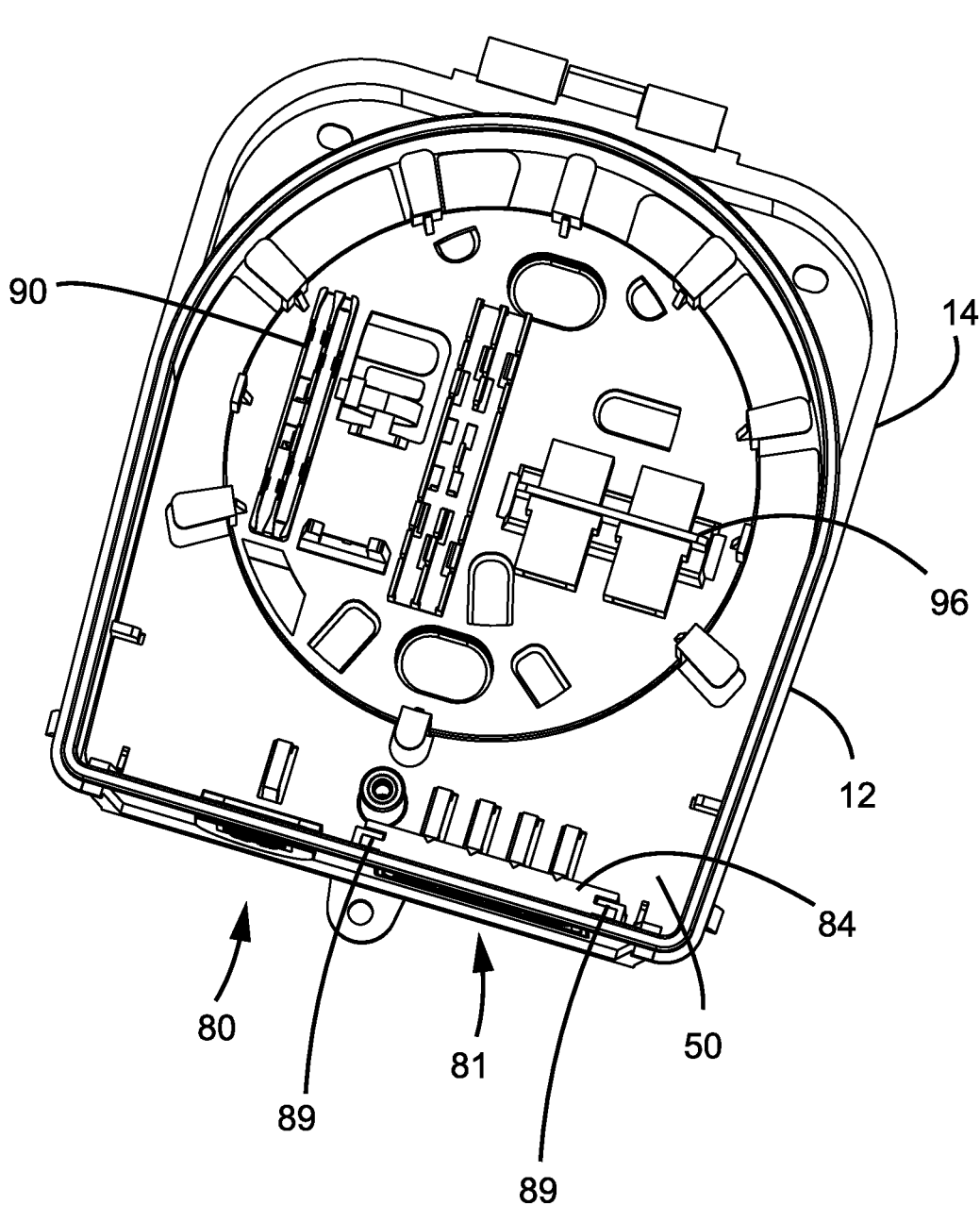
FIG. 13 is a further perspective view of the box of FIG. 12.
Figure 14:
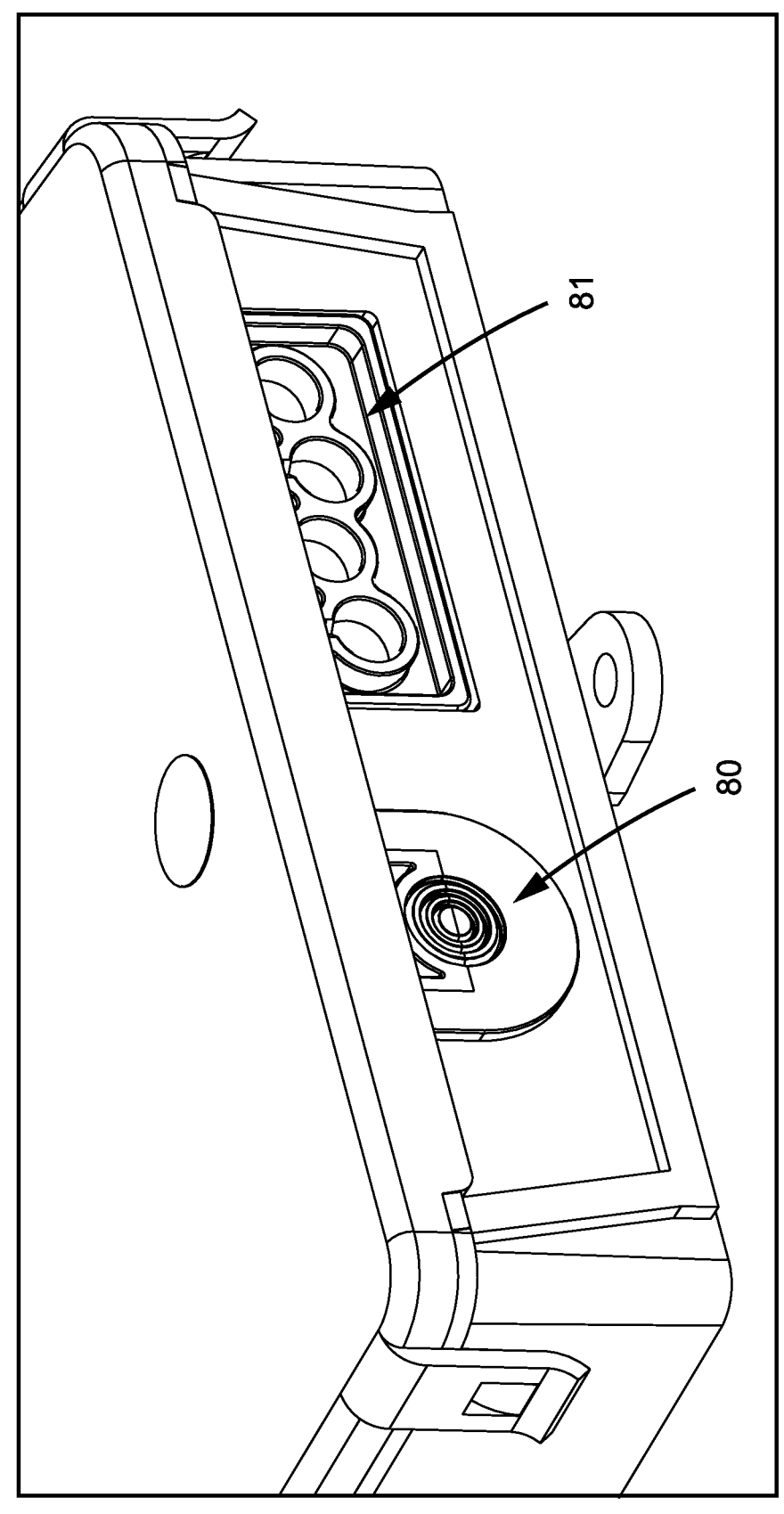
FIG. 14 is a perspective view of a bottom portion of the box showing one arrangement for the cable grommets.
Figure 15:
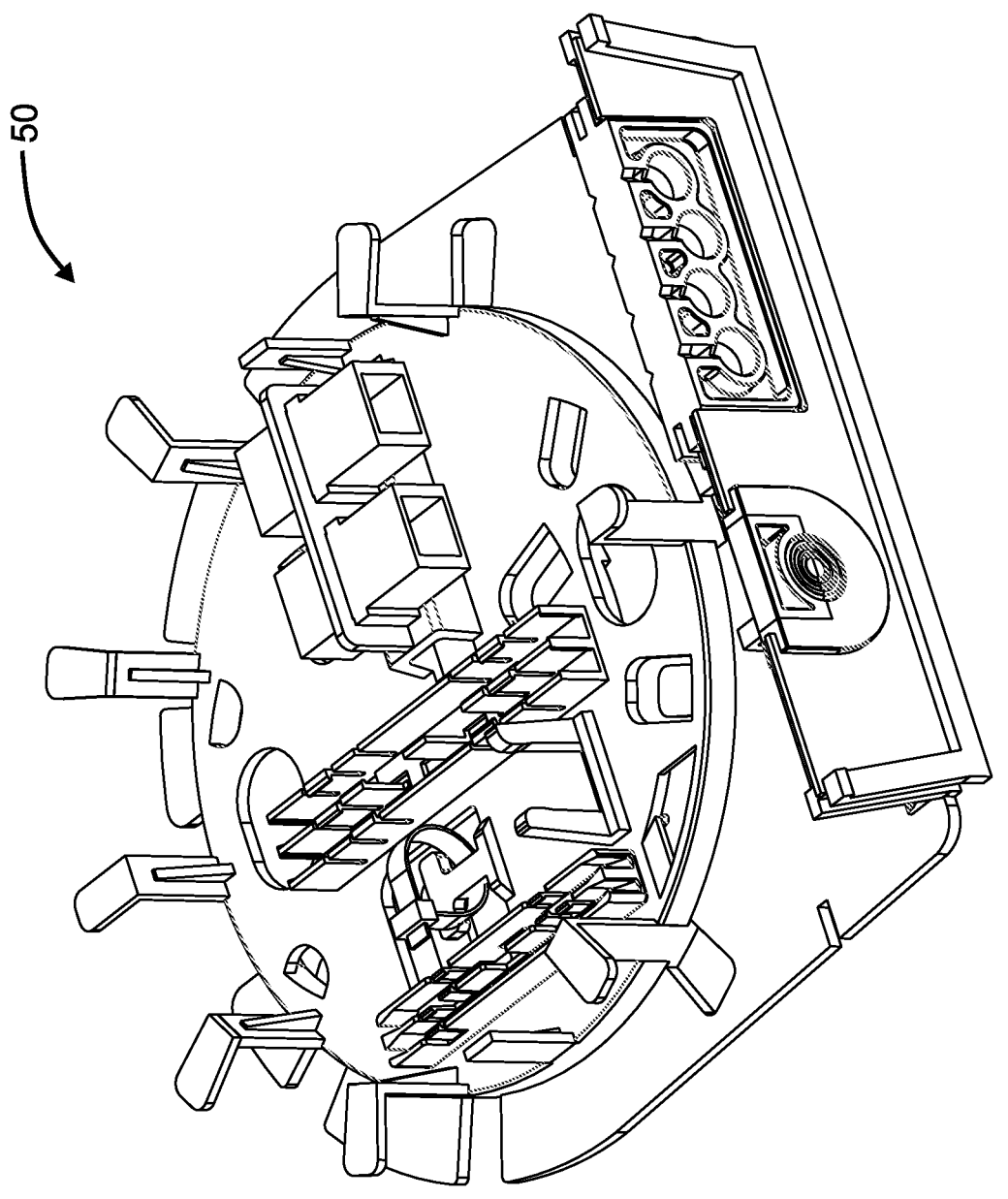
FIG. 15 is a perspective view of the tray.
Figure 16:
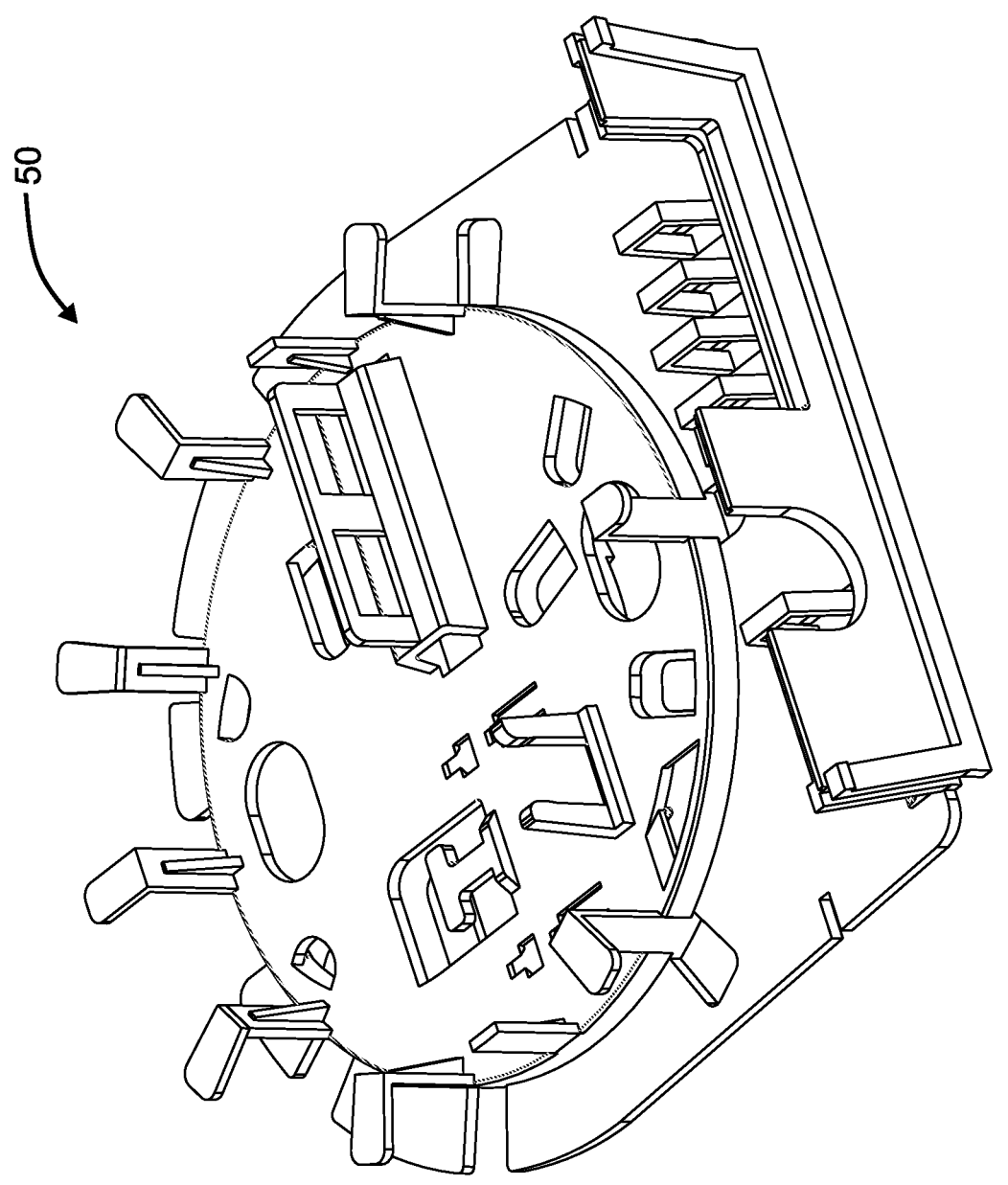
FIG. 16 is a further view of the tray of FIG. 15, without any components mounted thereto.

FIGS. 10 and 11 show slightly modified forms of box 10. Outer fingers 113 are provided to constrain slack in slack pathway, if desired. Two grommets 82 are shown.

As shown, elements within the tray 50 can be elevated, such as cable tie bars and adapter holder 96 to improve cable alignment and cable routing.

What is claimed is:

1. A telecommunications cable termination box comprising:

a housing defining an interior, the housing including a base and a moveable cover for accessing an interior of the housing;

a tray positioned in the interior of the housing;

a plurality of cable access openings through a flange of the tray;

a base portion of the tray including: a splice holder, an adapter holder, and cable tie bars;

wherein the base portion of the tray has an upper end, an opposite lower end, a left side and a right side;

wherein the flange defines a plurality of cable openings with a cable sealing device passing through the flange, the flange defining an exterior wall of the housing;

wherein the tray is movable from within the interior of the housing to an exterior of the housing;

wherein the tray includes an outer spool on a frontside of the base portion of the tray, the outer spool including a plurality of fingers, at least some of the fingers including fiber retention tabs extending generally parallel to the base portion of the tray, wherein the outer spool can store a first cable slack loop;

wherein the tray includes a cable slack storage area on a backside of the base portion of the tray, the cable slack storage area including a cable management wall and a plurality of cable management tabs extending generally parallel to the base portion of the tray, wherein the cable slack storage area can store a second cable slack loop;

wherein the adapter holder is located within the outer spool on the frontside of the base portion of the tray;

wherein the flange is located outside of the cable spool on the frontside of the base portion of the tray.

2. The telecommunications cable termination box of claim 1, wherein the housing includes at least one fastener opening positioned within a portion of the housing, but not in the interior of the housing where the tray is positioned.

3. A method of using a telecommunications cable termination box comprising:

a housing defining an interior, the housing including a base and a moveable cover for accessing an interior of the housing;

a tray positionable in the interior of the housing;

a plurality of cable access openings through a flange of the tray, wherein the flange defines at least one cable opening with a cable sealing device, the flange defining an exterior wall of the housing;

a base portion of the tray including: a splice holder, an adapter holder, and cable tie bars;

winding at least one cable around an outer spool of the tray while the tray is separate from the housing;

positioning the tray with the wound at least one cable within the interior of the housing;

connecting a first connector of the at least one cable to an adapter held by the adapter holder located within the outer spool;

sealing the at least one cable at a lower portion of the housing with a cable seal at a cable opening through a flange of the tray;

connecting a second cable to the at least one cable with a second connector at the adapter.

* * * * *